United States Patent [19]

Velke, Sr. et al.

[11] Patent Number: 4,997,147
[45] Date of Patent: Mar. 5, 1991

[54] SUPPORT FOR ELECTRICALLY ENERGIZED TUBING

[76] Inventors: David C. Velke, Sr., 3305 Aldie Rd., Catharpin, Va. 22018; George P. Marsden, 7621 Mary Cassatt Dr., Potomac, Md. 20854; Burton C. Leffingwell, 242 Meadows La., NE., Leesburg, Va. 22075

[21] Appl. No.: 429,492

[22] Filed: Oct. 31, 1989

[51] Int. Cl.⁵ .............................................. F16L 3/00
[52] U.S. Cl. .................................. 248/50; 248/68.1; 248/221.3; 248/221.4
[58] Field of Search .................. 248/50, 65, 68.1, 418, 248/417, 415, 289.1, 221.3, 221.4

[56] References Cited

U.S. PATENT DOCUMENTS

| 1,629,939 | 5/1927 | Turner | 248/418 X |
| 2,613,051 | 10/1952 | Baum | 248/50 |
| 2,629,814 | 2/1953 | Brown | 248/50 X |
| 2,850,560 | 9/1958 | Heyob et al. | 248/50 X |
| 3,239,184 | 3/1966 | Kirkeby | 248/568 |
| 3,563,504 | 2/1971 | Gordon | 248/68.1 |
| 4,703,909 | 11/1987 | Dayton et al. | 248/289.3 X |

Primary Examiner—Alvin C. Chin-Shue
Attorney, Agent, or Firm—Richard C. Litman

[57] ABSTRACT

A supporting assembly for energized tubing includes an elevated body having a top post section to which is mounted a rotary head having a clamp member base defining a longitudinal axis. A pair of lock arms project upwardly and are axially spaced apart to form a clearance therebetween which extends transversely of the base longitudinal axis. Position control elements on the head and elevated body cooperate to restrict arcuate displacement of the head to and between locked and unlocked positions disposed substantially 90 degrees apart. In the unlocked position, a tubing length may be inserted in the transverse clearance between the lock arms, following which, turning the head approximately a quarter turn swings the lock arms into engagement with the tubing with the position control elements serving to maintain an arcuate biasing force upon the head and lock arms in order to accommodate tubing of various diameters in a positive gripping manner. Associated cables are also captively retained by placement within a cable hanger extending from the elevated body and when the rotary head is moved to the locked position, a radial keeper on the head overlies the cable hanger.

11 Claims, 3 Drawing Sheets

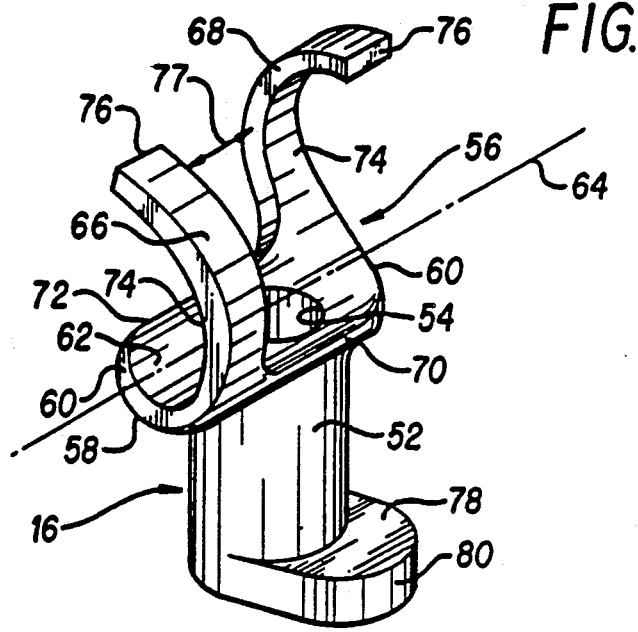
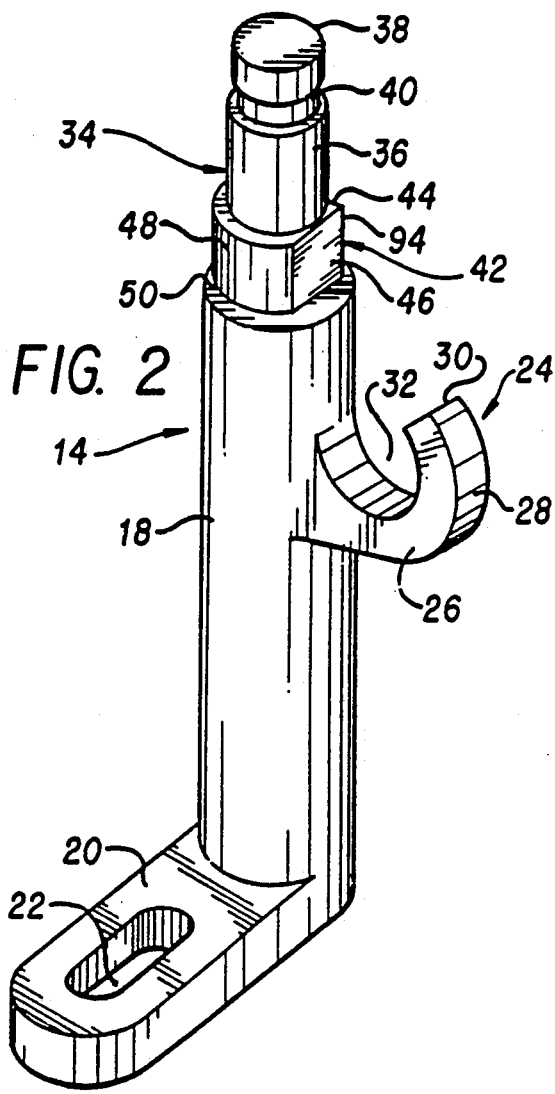
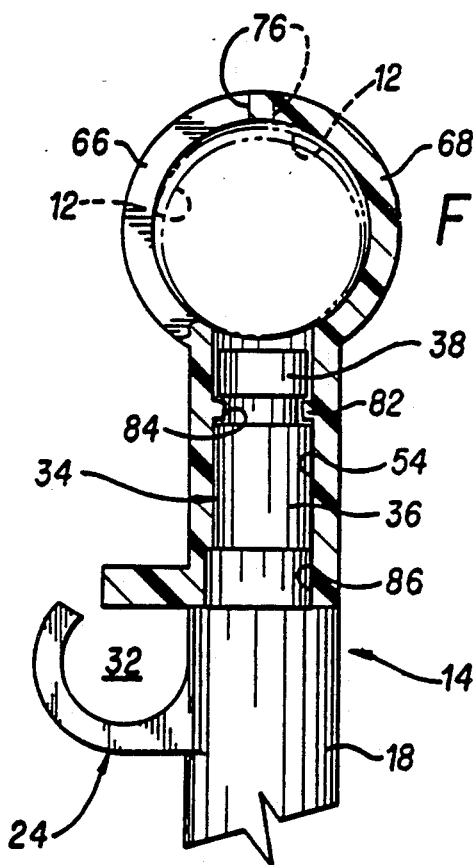
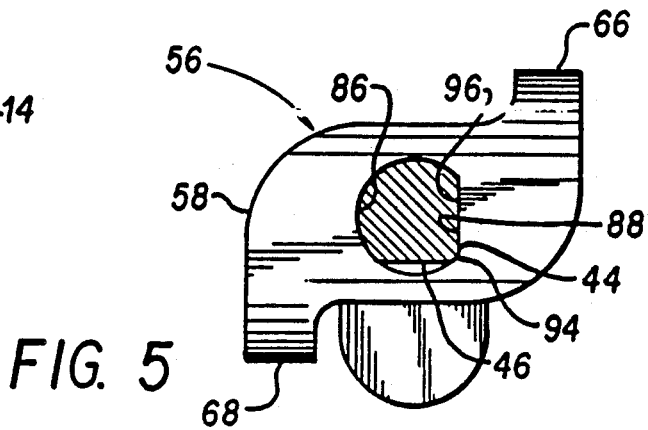

SUPPORT FOR ELECTRICALLY ENERGIZED TUBING

FIELD OF THE INVENTION

This invention relates to an improved insulating support for electrically energized elongated members, and more specifically, to a mounting device for the luminous tubing as used in sign displays such as neon signs and the like.

BACKGROUND OF THE INVENTION

Conventional advertising signs usually feature variously shaped luminous hollow tubing filled with an excitable gas such as neon. The letters or design of the sign are formed by a plurality of adjacently or serially mounted sections or lengths of the neon tubing. Each such section usually comprises a precurved or bent tubing length requiring two or more support means when it is installed in its display environment, such as a building front. It has been awkward at least, to readily affix this sign tubing to existing mounting or support devices, especially when it will be appreciated that most installations involve elevations well above the ground with the workmen operating from ladders or scaffolding and frequently mounting the tubing within shadow boxes. Additionally, a problem has existed in providing convenient means to secure the running lengths of electrical cable leading to the ends of each tube length in a sign.

DESCRIPTION OF THE RELATED ART

Various means have been used to secure gas tubes in the desired position as employed in a sign. Most frequently, the tubes are wired or taped to support members related conductive high-voltage cables remain loose or are taped to any available structure. Mounting an entire luminous system at the high altitudes where the signboards are usually placed demands precise and delicate manipulation and involves considerable risk, particularly when an intricate advertisement design is being created. Disclosed in the prior art have been different mounting means that provide partial solutions to the problem as in the case of U.S. Pat. No. 2,613,051 issued to Baum. The tube supports, as in this patent, provide a pair of grip fingers adapted to be rotated into engagement with a tube. The fingers are mounted for infinite arcuate adjustment and do not preclude the sliding or rattling of the tubes due to wind or vibrations, as there is no biasing of the fingers into the clamping arrangement. Nor do any of the conventional supports include means to secure associated high-voltage wire and prevent them from intertwining and increasing the risk of a short-circuit and explosion. Hence, there is an acute need for an efficient arrangement for mounting and reliably securing energized tubing together with any electrical cables connected thereto.

SUMMARY OF THE INVENTION

By the present invention, an improved support for energized tubing is provided and which allows one-handed manipulation to quickly and effortlessly capture and release both the tube as well as any eletrical cable that may be associated with the tubing.

Accordingly, one of the objects of the present invention is to provide an improved mounting assembly for energized tubing wherein a single turn of a gripping device reliably locks the tubing within the seat of the gripping means.

It is another object of this invention to provide a gripping device for the tubing support that applies a constant gripping force to the tubing to retain it in a fixed position, regardless of the various diameter in which the tubing is offered. It is a further object of the present invention to provide a gripping support for energized tubing including a locking provision for electric conductors feeding the tubing so as to facilitate the mounting of luminous signs and reduce the risk of short-curcuits, with the locking means being actuated concurrently with the gripping support.

Still another object of the present invention is to provide a support for enerzed tubing wherein a single turn of the gripping device locks the tubing and simultaneously captively retains adjacent electrical cables without any additional securing means or tools and solely by means of single handed manipulation.

The present invention utilizes an elevated post with a hookshaped radial projection on its medal portion. The upper portion of the elevated post includes a reduced diameter portion, which in one embodiment includes two adjacent flat faces disposed at an acute angle to each other. The second component of the assembly includes a hollow locking head having a radially protruding keeper element at its based and two inwardly curved arms at its top that serve to form a tubing seat. The bore of the hollow portion of the locking head includes a single flat cam face and is mounted on the elevated post in a position to define, with the two flat surfaces on the post, an open or unlocked position and a closed or locked position. In an alternative embodiment, the limits of travel of the head between the locked and unlocked position is required by means of a stop element on the elevated post and which is engaged within an accurate recess in the bottom of the locking head.

The present invention will be better understood from the following detailed description of a preferred embodiment with reference being made to the accompanying drawings, in which:

BRIEF DESCRIPTION OF THE DRAWINGS

FIG. 2 is perspective view of the elongated or elevate body member of the assembly, with the rotary head omitted;

FIG. 3 is a fragmentary side elevation, partially in section, of the top portion of the assemvly;

FIG. 4 is an enlarged perspective view of the rotary gripping head;

FIG. 5 is a bottom plane view of the rotary head illustrated in FIG. 4;

Similar reference characters designate corresponding parts throughout the several figures of the drawings.

DESCRIPTION OF THE PREFERRED EMBODIMENT

Figure 1A:
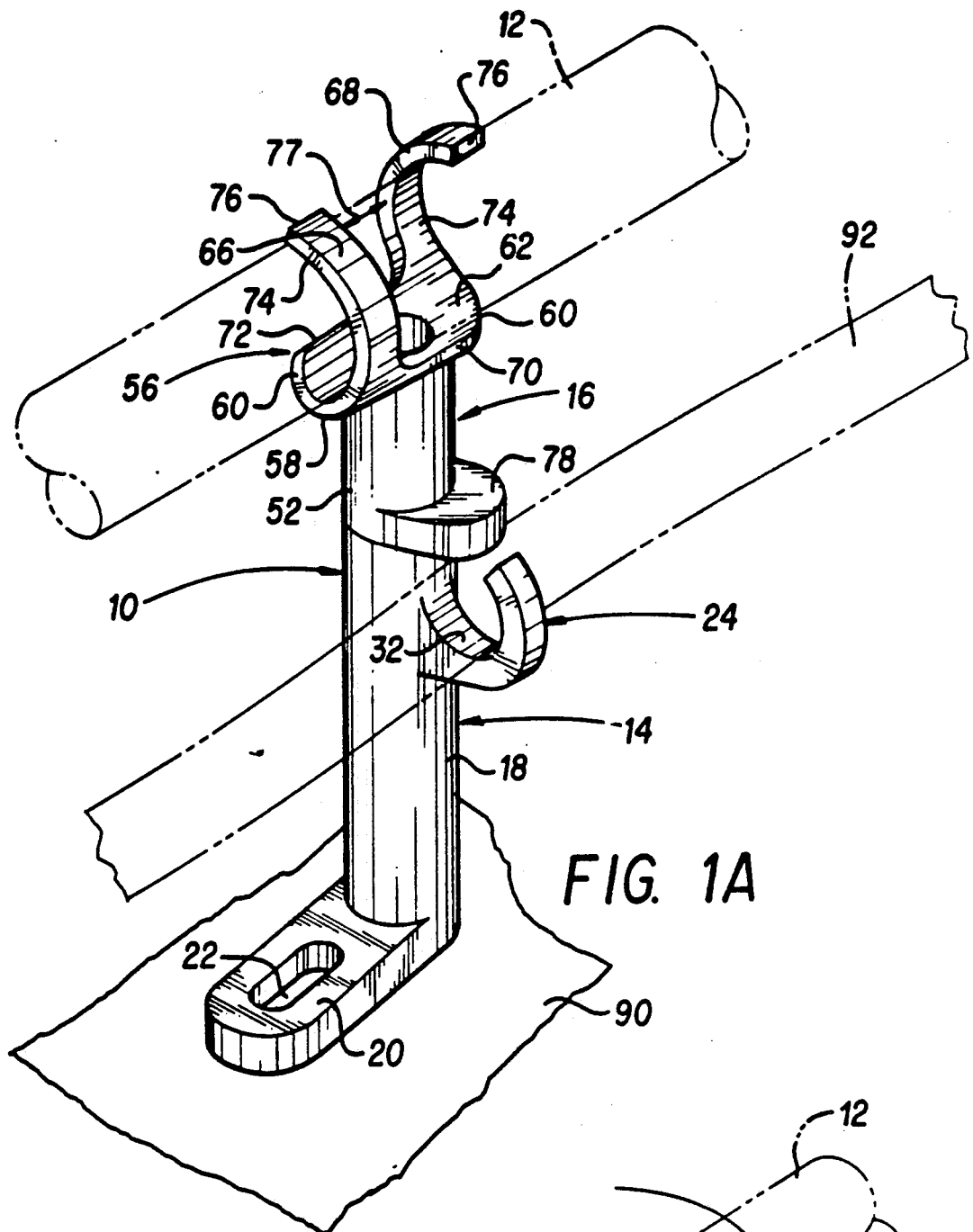
FIG. 1A is a perspective view if the support assembly according to the present invention as it appears in the locked position.
Figure 1B:
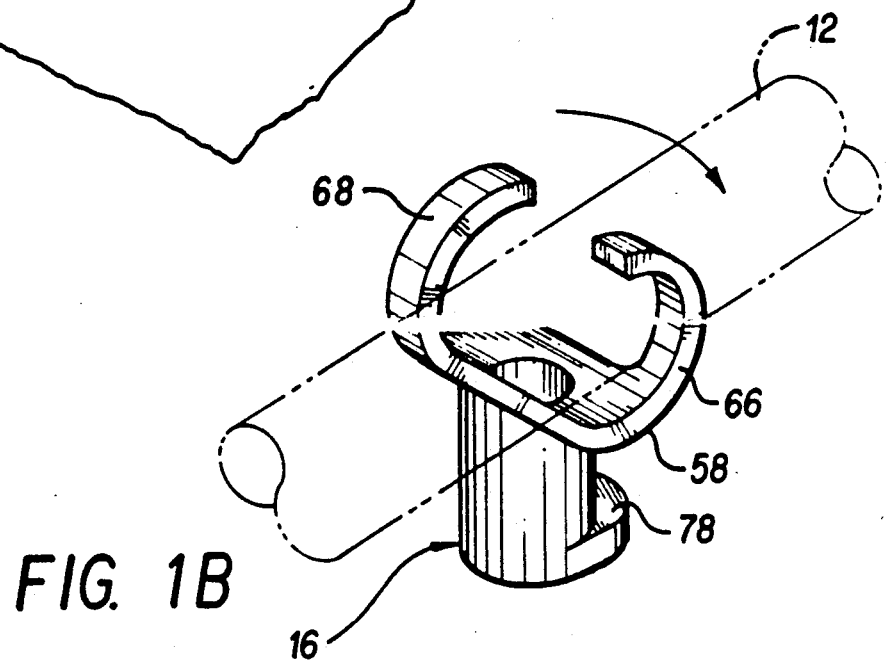
FIG. 1B is a fragmentary perspective view of the assembly of FIG. 1 with the rotary head depicted in the unlocked position.

Referring now to the drawings, particularly FIGS. 1A-1B, the present invention will be seen to relate to a novel insulative support assembly 10 especially adapted to positively retain a length of luminous gas tube 12, such as a neon gas tube as used in signs, The assembly 10 is constructed of any suitable insulative or dielectric composition exhibiting substantial rigidity yet possessing a nominal degree of resilience, for reason which will become apparent hereinafter. A typical composition which has been found to be satisfactory is LEXAN, a polycarbonate resin manufactured by General Electric Co.

Two unitary components make up the assembly 10 and comprise an elevated body 14 normally joined to an uppermost rotary head 16. As shown clearly in FIG. 2, the elevated body 14 includes an elongated section 18 having a lowermost, angular foot 20 provided with a radially extending elongated slot 22. Projecting outwardly from the medial portion of the elongated section 18 is a cable or wire hanger 24 and which preferably is disposed in a direction 90 degrees offset from the direction of the foot 20. The cable hanger 24 includes a lower base 26 joined to an upwardly and inwardly curved arm 28 terminating in a distal portion 30 and which will be seen to define an upwardly facing cable captive area 32.

Joined to the elongated section 18 is an integral top post section 34, constructed in a manner to provide for the snap-fit attachment and retention of the rotary head 16 as well as to regulate its manipulation between the limits of its locked and unlocked positions as depicted in FIGS. 1A and 1B, respectively. The medial axial extent of the top post section 34 comprises a central cylindrical portion 36 joined to a top portion 38 by an intermediate, reduced diameter, head assembly groove 40. The bottom of the central portion 36 is joined to the elongated section 18 by head position control means 42 comprising a pair of adjacent, flat cam faces 44, 46 and an arcuate periphery 48, which will be seen to define a radial extent greater than that of the central portion 36 yet less than that of the next below elongated section 18. In this manner, a decided horizontal shoulder 50 is provided intermediate the elongated section 18 and top post section 34.

The above described elevated body 14 serves as a mount for the rotary head 16, the latter of which includes a tubular body 52 having a central bore 54 through its length. As shown most clearly in FIGS. 3 and 4, the tubular body 52 supports a clamp member 56 including a horizontally elongated base or cradle 58 having opposite ends 60 providing an upwardly facing concave seat 62 defining a longitudinal axis 64. Tube gripping means are provided adjacent each cradle end 60, in the form of a pair of curved or arcuate lock arms 66, 68. One each of these arms will be seen to extend upwardly from each side edge 70, 72 of the clamp member base 58 and includes a curved inner periphery 74 providing a smooth continunity with the curvature of the base seat 62. The distal portion 76 of each lock arm 66, 68 preferably extends past the topmost point of an imaginary circle conforming to the arm inner peripheries 74 and disposed upon the seat 62 such that when viewed from either end 60 of the clamp member 56, the distal portions 76, 76 appear to overlap one another as shown in FIG. 3. The two arms 66,68 will be understood to be adjacently spaced apart from one another a sufficient distance, as represented by the clearance 77, which will freely accept the entry therebetween, of the largest diameter tubing 12 intended to be used with the support assembly 12.

The head 16 includes a radial keeper 78 projecting from the lowestmost part of the body 52 and which is preferably provided with a rounded outer nose 80. This keeper radially extends in a direction which is substantially normal to the clamp member base axis 64. The central bore 54 is constructed in a manner to cooperate with the aforedescribed top post section 34 of the elevated body 14 to initially, allow a snap-fit assembly of the two components 14, 16 and subsequently, control manipulation of the rotary head 16 between the two positions of FIGS. 1A and 1B. The snap-fitting of the components is achieved by means of the inclusion of a radially projection engagement element 82 extending inwardly of the wall of the bore 54 and which is adapted to be disposed within the top post groove 40 when the head 16 is urged downwardly upon the post section 34. The inner surface of the radial element 82 may be chamfered, as at 84, to facilitate the passage of the element 82 past the top portion 38 of the post 34. In any case, it will be understood that the inherent limited resilience of the material of at least the rotary head 16, permits the above reaction between the components as they are assembled.

The lower portion of the head bore 54 is constructed to accommodate the head position control means 42 located at the bottom of the top post section 35 and includes a constant radius arcuate surface 86 encompassing an arc of at least 270 degrees and which is bounded by a flat, cam follower surface 88 as shown in FIG. 5. The horizontal extend of this cam follower surface 88 is substantially identical to the horizontal extent of each of the cam faces 44, 46 on the top post position control means 42, for reasons which become apparent hereinafter.

When the above described components are assembled and the head 16 is located in the unlocked position as in FIG. 1B, a section or length of tubing 12 may be easily inserted or removed from the lock arm clearance 77, atop the head cradle 58. It will be appreciated that during the installation of luminous signs, a plurality of shaped lengths of tubing 12 must be handled. By means of the present invention, two or more of the instant support assemblies 10 will be understood to be used to mount each such tube length and these will have been previously affixed to an appropriate base 90 by employing any suitable fastener (not shown) through the respective foot slots 22. The rotary head 16 is related in this unlocked position by means of its cam follower surface 88 being contiguous with the top post second cam face 46.

Following disposition of the tubing 12 within the head clearance 77 of each of the support assemblies being used for a particular tube, any electrical cable 92 associated with the tubing and within the area of any one support assembly 10 may be secured at this time by locating this cable within the captive area 32 of the respective cable hanger 24. Thereafter, whether or not any of the involved assemblies 10 contain a cable within their hanger, each head 16 is rotated clockwise approximately 90 degrees, from the unlocked position of FIG. 1B to the locked position of FIG. 1A. During this arcuate displacement of the head 16, the two arms 66, 68 each progressively envelopes about one-half the perimeter of the contained tubing 12 while simultaneously, the radial keeper 78 swings 90 degrees to a position overlying the access to the cable hanger captive area 32.

In the above locked position it will be seen that not only is the tubing secured within the head 16 but also, the associated cable is blocked from removal and therefore retained within the cable hanger 24. The head 16 is retained in this locked position as its cam follower surface 88 substantially overlies the second cam face 46 on the top post 34. A decided, position manipulation of the head 16 is required to shift between the two above positions and during such movement, the user will feel the vertical, radial edge 94 intermediate the two cam faces 44, 46 bias against and slightly deflect the head cam follower surface 88 as this surface travels between the two cam faces 44, 46.

The included angle between the two cam faces 44, 46 is slightly less than 90 degrees, and for a specific reason. This, coupled with the fact that the second cam 46 is in a plane slightly past the plane normal to the radial extention of the cable hanger 24, insures that as the head 16 is disposed from the unlocked to the lock position, the intermediate edge 94 of the control means 42 will still engage the head cam follower in the area as shown by the references 96 in FIG. 4, when the head axis 64 is in the locked position. Such construction has two advantages. First, it encourages a firm gripping of the captured tubing 12 as the above offest disposition of the plane of the second cam face 46 urges the head cam follower 88 and thus the head lock arms 66, 68 into a biasing direction against the tubing 12. Secondly, tubing 12 of various sizes may be firmed gripped by the same support assembly 10. Neon signs tubes for exanmple, are employed in three principles sizes namely, 10, 12 and 15mm diameter. By the offset of the second cam face 46, the head is urged to swing the two lock arm 66, 68 such that the inner peripheries 74 thereof are moved relatively close to the contained tubing 12 and accordingly, would firmly grip the smallest tubing used. As a larger diameter tubing is used, the same positive gripping action will be achieved, although the head will not be used as far in the clockwise dirction.

Regardless of the size tubing employed with the present invention, the radial keeper 78 will serve to retain a cable 92 within the captive area of the cable hanger 24, when the head is in the locked position of FIG. 1A. Although the angular disposition of the radial keeper 78 will vary slightly, according to the size tubing 12 being supported, such variation will still allow blocking of the cable in its captive condition.

Figure 6:
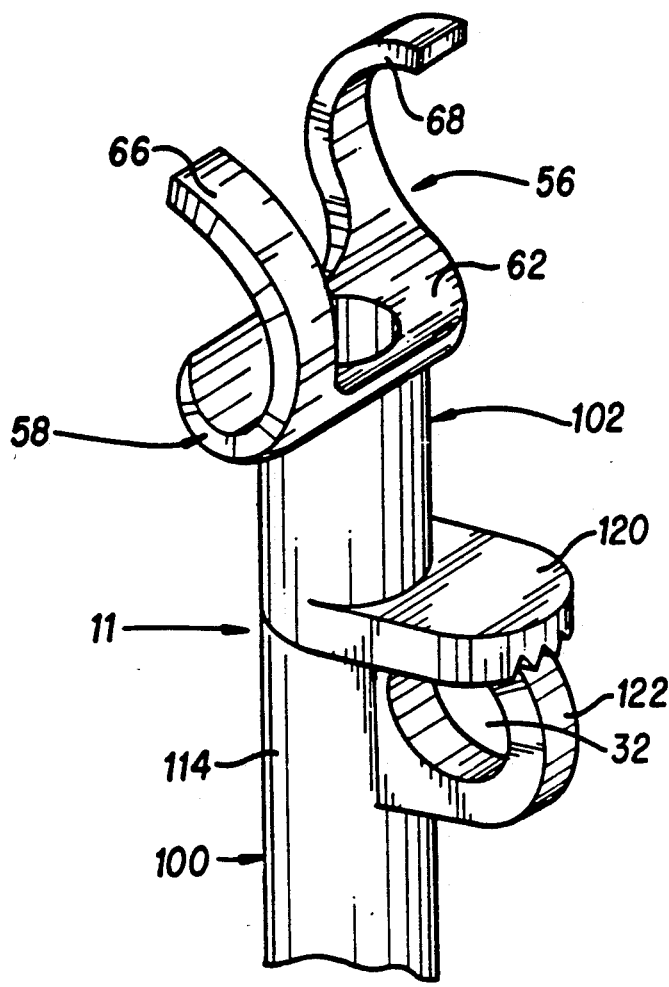
FIG. 6 is a partial perspective view of an alternative embodiment of the invention.
Figure 7:
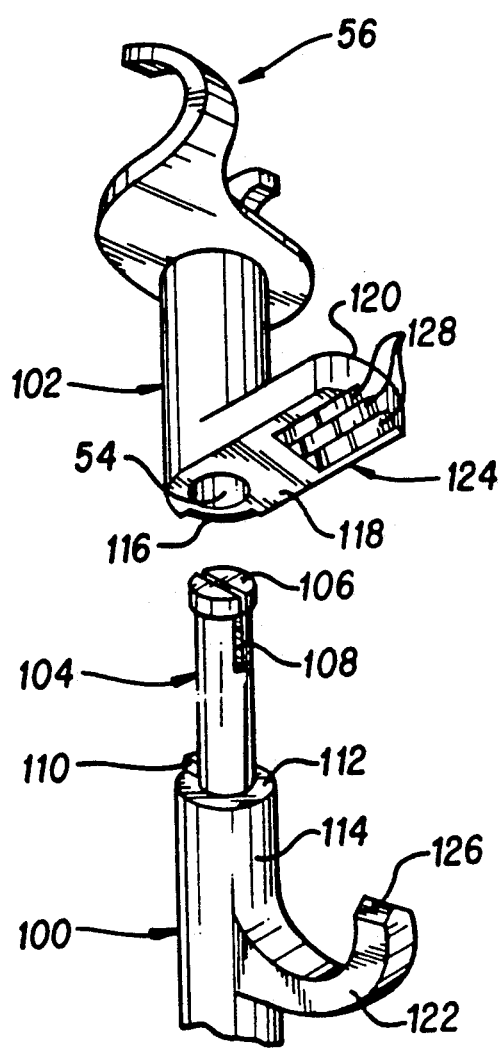
FIG. 7 is a partial, exploded perspective view of the two components shown assembled in FIG. 7.

FIGS. 6–7 illustrate an alternative embodiment of a support assembly 11 wherein the general, overall configuration of the elevated body 100 and rotary head 102 appear somewhat similar to that of the support assembly 10 and the function of the assembly is like that as previously described. However, the support assembly 11 utilizes a different head position control means as shown in FIG. 7 and provides adjustable, frictional engagement between the displaceable radial keeper and stationary cable hanger.

As will be seen from FIG. 7, the top post section 104 includes a radially extending top portion 106 which provides for a snap-fit installation of the rotary head 102 upon the elevated body 100, in a manner similar to the top portion 38 of the first described embodiment 10. To facilitate the passage of the top portion as the head is lowered, the upper end of the top post section 104 is provided with a vertical slot 108 therein. With this construction, an engagement element such as element 82 in the head of FIG. 3 will readily urge the bifurcated upper ends of the top post section together as the head is assembled on the elevated body 100, with these ends then returning to their normal position after passing beneath the head engagement element.

The limit of arcuate displacement of the assembled head 102 is regulated by means of a stop member 110 projecting upwardly from the top shoulder 112 on the elongated lower section 114 of the body 100 and which is captively disposed within an arcuate recess or groove 116 in the bottom surface 118 of the rotary head 102. The relative angular position of the stop member 110 and/or groove 116, the latter of which subtends an angle of substantially 90 degrees, are selected to insure that the radial keeper 120 overlies the cable hanger arm 122 throughout the alternate locked positions of the rotary head, according to the various diameter tubes as supported thereby. A positive, frictional engagement between the radial keeper 120 and hanger arm 122 is achieved, throughout this range of locked positions, by providing a roughened surface 124 on the underside of the keeper 120 and which cooperates with a retainer edge 126 formed on the end of the cable hanger arm 122. The surface 124 may comprise a plurality of radially extending grooves 128 while the retainer edge 126 may define a radially extending beveled edge adapted to fit within any one of the keeper grooves 128.

With the above described construction, it will be appreciated that when the head 102 is rotated toward the locked position of FIG. 6, the bottom surface 118 of the keeper 120 will engage the hanger arm retainer edge 126 and due to the inherent resilience of both the keeper and arm, a snap-action type of engagement will occur as the head is rotated to the fully locked position. When thusly fully locked and according to the size tubing 12 within the head 102, the retainer edge 126 will be seated in one of the plurality of keeper grooves 128.

Accordingly, the present invention will be seen to make it possible to reliably secure energized tubing and its feeding cables by a single-handed operation involving but one turn of the locking head and without any additional tools or materials. The advantages of such a simplified manipulation can not be taken lightly when one considers that heretofore, the installation of sign tubing has required first, a means of retaining a tubing section in contact with one or more support members while secondly, another pair of hands have been necessary to wire tie or otherwise affix the tubing to each support member. By the present invention, manipulation by a single hand alternately locks or unlocks a clamp member with respect to a tubing length and also, simultaneously captivates or permits access, to a cable section. The inherent resilience of the material of one or both primary components of the support assembly allows operation of the head position control means to regulate arcuate displacement of the locking rotary head and provides a positive biasing action when in, at least the locked position.

It is to be understood that the present invention is not limited to the sole embodiments described above, but encompasses any and all embodiments falling within the scope of the following claims.

We claim:

1. A support assembly for elongated tubing comprising;

an elevated body including a lower elongated section joined to a top post section, a rotary head mounted upon said body top post section and including a clamp member joined to a lower tubular body having a central bore, said central bore at least in part surrounding said top post section, said clamp member including a base having a pair of opposite ends and a pair of opposite lateral edges and defining a longitudinal axis extending through said ends, lock arms extending upwardly and inwardly relative each of said pair of base lateral edges respectively on opposite sides of said longitudinal axis, said lock arms spaced from one another relative said longitudinal axis and defining a clearance therebetween extending transversely of said longitudinal axis, head position control means on said elevated body and said lower tubular body of said head operable to limit arcuate displacement of said head between either one of two alternate angular positions relative said elevated body, said alternate positions including unlocked positions with said longitudinal axis being displaceable substantially 90 degrees between said unlocked and locked positions, said control means including retention means biasingly retaining said head in said locked position, whereby said head is arcuately displaceable from said unlocked position wherein a length of tubing may be inserted or removed from a position extending transversely of said longitudinal axis and within said clearance between said lock arms, to said locked position wherein said head base is arcuately displaced substantially 90 degrees with said lock arms biasingly engaging the tubing and with the tubing approximately aligned with said longitudinal axis, a cable hanger arm extending outwardly from said elevated body and adapted to support a cable thereupon, and a keeper radially projecting from said head tubular body and overlying said hanger arm when said rotary head is in said locked position to captively retain a cable within said hanger arm.

2. A support assembly to claim 1 including;
a mounting foot radially extending from said elevated body, and
said foot including a fastener receiving opening.

3. A support assembly according to claim 1 wherein;
said clamp member base includes an upwardly facing concave seat adapted to receive tubing when said head is in said locked position, and
said lock arms each including a smoothly curved inner periphery each describing in combination with said seat, an arc no less than 180 degrees.

4. A support assembly to claim 1 wherein;
said rotary head is constructed of dielectric composition possessing at least a minimal degree of resiliency.

5. A support assemmbly according to claim 1 wherein;
said rotary head and top post section are provided with cooperating snap-fitting means permitting of initial assembly of said head central bore about said top post section.

6. A support assembly according to claim 1 wherein;
said head position control means includes a stop member on one said elevated body and head tubular body and disposed within an arcuate groove within the other one said elevated body and head tubular body.

7. A support assembly according to claim 1 wherein;
said cable hanger arm terminates in an uppermost retainer edge,
said keeper having a bottom surface disposed in a horizontal plane substantially coplanar with said cable hanger arm retainer edge,
a roughened area on said keeper bottom surface, and
said keeper roughened area engageable with said cable hanger arm retainer edge when said head is displaced to said locked position.

8. A support assembly according to claim 4 wherein;
said dielectric composition comprises LEXAN.

9. A support assembly according to claim 5 wherein;
said snap-fitting means includes a circumferential groove in said top post section and an engagement element on said head tubular body radially projecting inwardly of said tubular body bore.

10. A support assembly according to claim 7 wherein;
said roughened area includes a plurality of substantially radially extending grooves.

11. A support assembly according to claim 1 wherein, said head position control means includes cooperating irregular configurations on said lower tubular body of said head and on said elevated body.

* * * * *